US007828646B2

(12) United States Patent
Franks, Jr.

(10) Patent No.: US 7,828,646 B2
(45) Date of Patent: Nov. 9, 2010

(54) CASINO ALL IN ONE KIOSK FOR CASH, TICKETS, AND CARDS, WITH CARD ISSUING CAPABILITY

(75) Inventor: Thedfred E. Franks, Jr., Highland Village, TX (US)

(73) Assignee: Giesecke & Devrient America, Inc., Dulles, VA (US)

( * ) Notice: Subject to any disclaimer, the term of this patent is extended or adjusted under 35 U.S.C. 154(b) by 1437 days.

(21) Appl. No.: 11/240,486

(22) Filed: Oct. 3, 2005

(65) Prior Publication Data
US 2006/0073883 A1  Apr. 6, 2006

Related U.S. Application Data

(60) Provisional application No. 60/615,583, filed on Oct. 5, 2004.

(51) Int. Cl.
*G06F 17/00* (2006.01)
(52) U.S. Cl. ............................................. 463/25
(58) Field of Classification Search ............ 463/16–25
See application file for complete search history.

(56) References Cited

U.S. PATENT DOCUMENTS 5,596,642 A * 1/1997 Davis et al. .................. 705/68
5,596,643 A * 1/1997 Davis et al. .................. 705/68
5,621,796 A * 4/1997 Davis et al. .................. 705/68
5,633,930 A * 5/1997 Davis et al. .................. 705/68
6,048,269 A    4/2000 Burns et al. .................. 463/25
6,129,273 A * 10/2000 Shah .......................... 235/380
6,729,957 B2   5/2004 Burns et al. .................. 463/25
6,736,725 B2   5/2004 Burns et al. .................. 463/25
6,778,693 B2   8/2004 Jones et al. .................. 382/135
6,910,625 B2   6/2005 Teixeira Gomes ........... 235/379
6,945,457 B1 * 9/2005 Barcelou ..................... 235/380
7,571,850 B2 * 8/2009 Barcelou ..................... 235/379
7,575,158 B2 * 8/2009 Barcelou ..................... 235/379
2003/0040356 A1* 2/2003 Gauselmann ................ 463/20
2004/0147309 A1   7/2004 Chamberlain et al. ........ 463/25
2008/0255901 A1* 10/2008 Carroll et al. ................. 705/7

FOREIGN PATENT DOCUMENTS

WO  WO 99/21141   4/1999
WO  WO 02/095696  11/2002
WO  WO 03/071387  8/2003

* cited by examiner

*Primary Examiner*—Ronald Laneau
(74) *Attorney, Agent, or Firm*—Bacon & Thomas, PLLC

(57) ABSTRACT

A casino all-in-one kiosk includes a card issuing unit that enables self service registration and dispensing of casino loyalty cards, in addition to cash-dispensing, and ticket redemption functions. The kiosk may also be adapted to provide ancillary services such as hotel check-in/check-out, reservations and ticketing, and coupon printing, and may further be integrated with a financial services network to provide banking and credit card services.

35 Claims, 4 Drawing Sheets

CASINO ALL IN ONE KIOSK FOR CASH, TICKETS, AND CARDS, WITH CARD ISSUING CAPABILITY

This application claims the benefit of provisional U.S. Patent Application Ser. No. 60/615,583, filed Oct. 5, 2004.

BACKGROUND OF THE INVENTION

1. Field of the Invention

This invention relates to a currency-dispensing self-service terminal or kiosk apparatus for use in casinos, and in particular a casino all-in-one kiosk that is capable of issuing casino loyalty cards.

In addition to issuing casino loyalty cards, the kiosk of the invention may provide a variety of customer services related to the loyalty cards and the casino environment, including tracking of point totals and redemption of points or winnings, as well as ticket redemption, bill breaking, hotel check-in/check-out, dispensing of coupons or show tickets, ATM functions, and so forth.

To carry out these services or functions, the terminal of the invention preferably includes a secure cabinet; a card reader/writer; a card issuing/dispensing unit (which may be integrated or combined with the reader/writer); a ticket/receipt printer; a note/ticket (or bill/ticket) validation/acceptance unit; a coin dispenser; a currency dispensing system; a central processing unit; and a display/data input unit. Additional units, modules, devices, or systems may also be provided in the kiosk, such as an uninterruptible power supply (UPS), alarm system, and/or interfaces to a central casino accounting system or financial services provider.

2. Description of Related Art

Casino all-in-one terminals for enabling a customer to redeem tickets/vouchers issued by gaming machines for cash have been approved in a number of gaming jurisdictions. The tickets/vouchers are issued by gaming machines in lieu of cash payouts, so that the customer does not need to transport or hold large amounts of cash while gaming. Upon completion of play, the customer takes the ticket to the kiosk rather than a cashier's window, inserts the ticket, and receives a cash payout. Typically, the ticket contains a barcode, a written ticket amount, the time and date of printing, a numerical representation of the barcode, and other identification, validation, or promotional information. When a cash out ticket is inserted into a ticket reader equipped in a kiosk, the ticket reader forwards the information represented by the barcode to a ticket validation system, which may be included in the kiosk itself or integrated with the casino's central accounting software, after which the ticket validation system either authorizes a cash dispenser to dispense cash or, if the ticket is not valid, returns the ticket and directs the customer to a cashier.

In addition to ticket/voucher redemption services, it is known to arrange casino terminals or kiosks to accept casino loyalty or gaming cards, which are personal to the customer and serve as an electronic purse or token to keep track of amounts won and lost at the gaming machines, and which may also be used to provide customers with bonuses or incentives for frequent usage, such as increased gambling payouts, food or drink coupons, hotel privileges, and so forth. Upon completion of play, the customer inserts the loyalty card into the kiosk, identifies himself or herself, and then may check his or her award status/totals, and redeem any winnings for cash. Known means of identification include entry of passwords or personal identification numbers (PINs), use of a biometric scanner or reader (e.g., a fingerprint reader), and scanning of standard, stacked, or two-dimensional bar-coded identification cards or drivers' licenses.

The use of tickets to facilitate gaming machine payouts, and the use of casino loyalty or gaming cards to reward gaming at the issuing casino, offer substantial advantages to both the casino and the customer. The customer benefits from the convenience of not having to carry cash and from the bonuses or awards associated with the cards, while the casino benefits from customer loyalty, lower labor costs, and increased security. Player loyalty cards, in particular, are an excellent marketing tool for the casino since they encourage holders to favor the issuing establishment over other establishments, and encourage increased spending due to the convenience of using the cards and in the hopes of receiving rewards.

However, a significant proportion of the income of casinos is provided by passersby or casual visitors, who are less likely than a regular customer to obtain player loyalty cards. Typically, the holder of a gaming/loyalty card is a regular casino customer, or one with a history of spending large amounts at the gaming machines. Obtaining a card requires the customer to seek out a card issuing official at a desk or window, fill out forms, and wait for the card to be issued. While not unduly burdensome for a frequent customer, the casual customer who is just passing through the casino on the way to the buffet or a show has little motivation to apply for a card. If the casino could encourage more casual visitors to obtain loyalty cards, and even just a few of those visitors were encouraged to increase time spent at gaming machines, or to choose the issuer for repeat visits, the casino would realize significant benefits.

In addition, sports betting is a common feature at many casinos. In sports betting, bets are placed on the outcomes of sporting events. When placing a bet, the customer must go to a counter and place the bet with casino personnel. The customer is then given a ticket as a receipt of the bet. This process is inconvenient, as the customer must wait for the casino personnel to fill out the appropriate documentation and then the customer must redeem any winnings either from a separate ticket redemption machine or casino personnel. This process takes time, especially if many customers are placing bets and/or collecting winnings. It would therefor be advantageous to provide a single kiosk where the customer could quickly and easily place a sports bet and also redeem any winnings.

SUMMARY OF THE INVENTION

It is accordingly an objective of the invention to provide an apparatus for facilitating the issuance of casino loyalty or gaming cards (also known as player cards, club cards, reward cards, and the like), for tracking a customer's winnings, bonuses, and awards. The loyalty cards may be secured magnetic stripe cards or smart cards, and are designed to be inserted into or interact with gaming machines to upload bets and store payouts, as well as to facilitate tracking of "points" or bonuses and awards.

It is a second objective of the invention to provide a casino all-in-one kiosk that offers casino loyalty card issuance and management functions, cash-dispensing, ticket redemption, electronic funds transfer (EFT), ticket issuance, and other casino-related services, including issuance and management of magnetic strip or smart cards other than casino "loyalty" cards, such as cards that permit electronic funds transfer (EFT), gift cards, or hotel room "keys".

It is a third objective of the invention to provide a casino all-in-one kiosk that not only issues casino loyalty and other types of cards, dispenses cash and redeems tickets, but that also provides ancillary services such as hotel check-in/check-out, reservations and ticketing, and coupon dispensing, and that may further be integrated with a financial services network to provide banking and credit card services.

These objectives are accomplished, in accordance with the principles of a preferred embodiment of the invention, by providing a casino all-in-one kiosk that includes a magnetic stripe and/or smart card dispensing device in addition to note/ticket accepting and currency payout devices, thereby encouraging passersby and users of the machine for ticket redemption and bill breaking to register for casino loyalty programs.

According to a preferred embodiment of the invention, the casino all-in-one kiosk includes a ticket/currency acceptance device; a card reader/writer/dispensing device(s); an input/output display device; a central processing unit; and a currency dispenser including bill and coin dispensing devices. Each of these devices is preferably housed in a secure cabinet or safe with an alarm, and connected to the central processing unit, which in turn is connected to a casino central office and/or a financial services provider via one or more external port(s).

Those skilled in the art will appreciate that the hardware components which make up the kiosk are, in general, commercially available devices, and that a variety of equivalent devices may be substituted for the specific devices described herein. The software that coordinates and controls the various devices is not commercially available and will be described below, although individual commercially available subroutines or drivers may be included in the software.

The apparatus of the invention may optionally include a biometric reader for receiving a biometric identifier, such as a fingerprint, to verify the identity of a card holder. Upon input of the biometric data, the kiosk either compares the input biometric data with corresponding data stored on the card, with data stored in an internal database, and/or with data stored in a central database, and then authorizes further transactions if verified, or terminates the transaction and/or alert security if not verified.

In addition, the apparatus of the invention may optionally enable a customer to manage various transactions related to accommodations, such as checking in and/or checking out of a customer's room at a casino hotel, room key issuance or return, or obtaining reservations and tickets for meals, shows, tours, and other casino amenities or amusements. These transactions may be integrated with the loyalty card system, in which the customer can redeem bonuses or awards such as shoe shine vouchers, food or drink credits, complimentary club admission, and so forth at the time of check in/check out.

The apparatus of the invention may also be modified or adapted to perform automated teller machine or banking functions such as balance transfers, credit card advances, check deposits, and so forth.

Finally, the display of the preferred apparatus may be used to show promotional videos between transactions or while the customer is waiting for a transaction, or part of a transaction, to be completed. The display may also be arranged to provide directions and customer assistance or information, display menus for maintenance personnel, and perform any other functions of which a conventional kiosk display is capable.

Those skilled in the art will appreciate that the above list of capabilities or functions performed by the apparatus of the invention is not intended to be exhaustive and that other functions and/or devices may be added without departing from the scope of the invention.

DETAILED DESCRIPTION OF THE PREFERRED EMBODIMENTS

Figure 1:
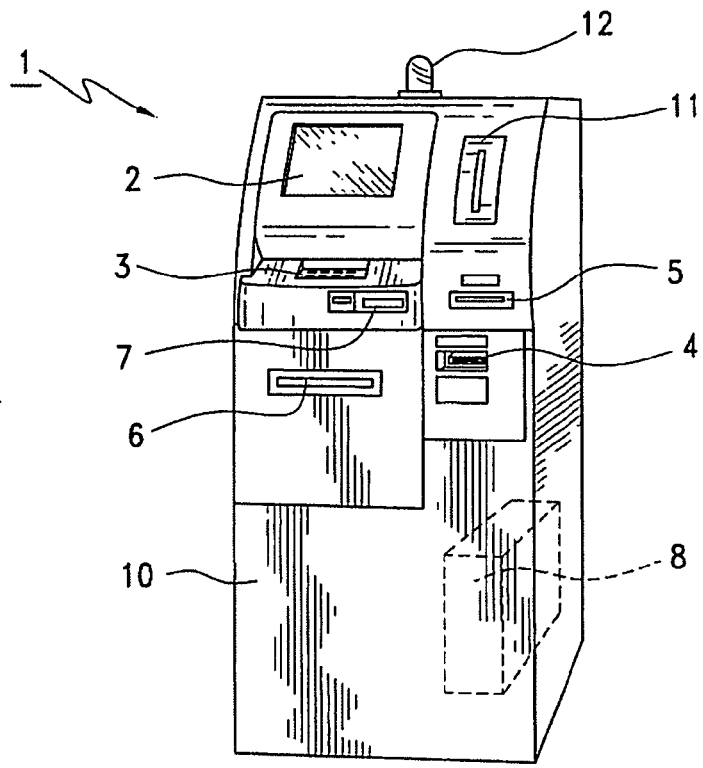
FIG. 1 is a perspective view of a kiosk constructed in accordance with the principles of a preferred embodiment of the invention.
Figure 2:
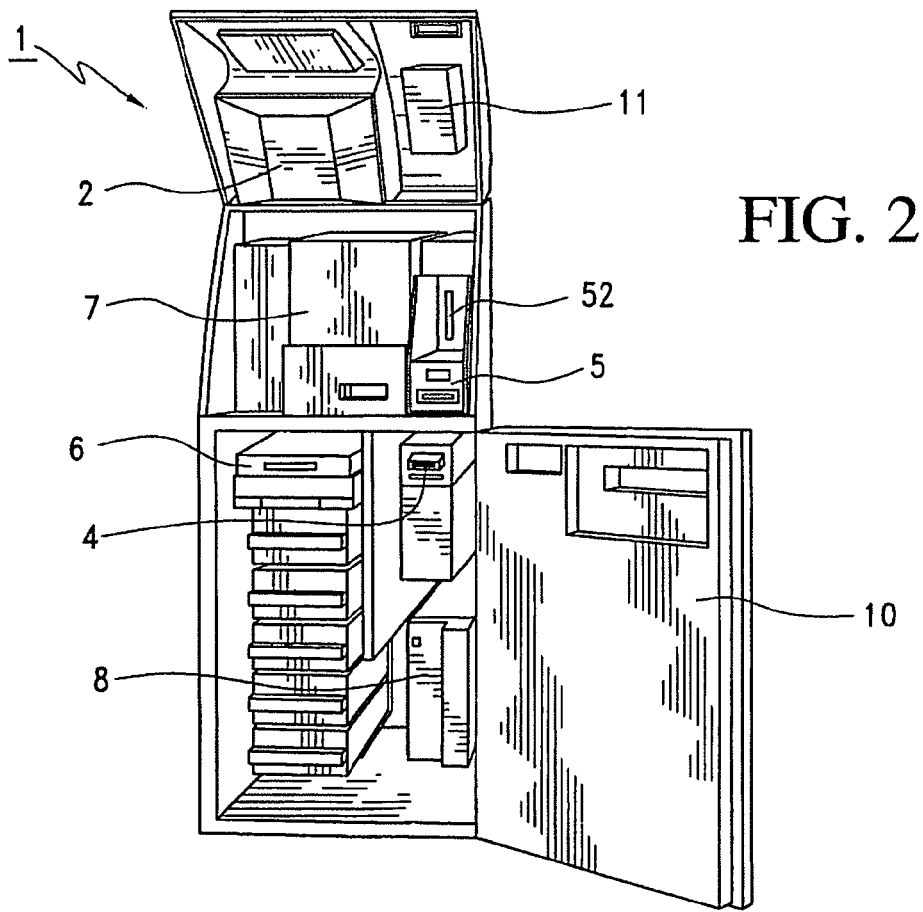
FIG. 2 is a perspective view of the kiosk of FIG. 1 with exposed internal components.

As illustrated in FIGS. 1 and 2, an all-in-one self-service kiosk 1 constructed in accordance with the principles of a preferred embodiment of the invention includes a touch screen display unit 2, a secure PIN pad 3, a note/ticket (voucher) acceptor unit 4, a magnetic card reader/writer 5, a card dispenser 52 (see FIG. 2) that may be integrated with reader/writer 5 or separate, a note dispenser 6, a coin dispenser 7, a central processing unit (CPU) 8, and an uninterruptible power supply (UPS) (not shown) provided in a secure cabinet 10. In addition, the kiosk includes a receipt printer 11 and one or more signal lamps 12 for signaling casino employees to attend to malfunctions, refill cash/coin bins, assist customers, and so forth.

The following description includes manufacturer and model numbers for the illustrated components, where applicable, but it is intended that the invention not be limited to any particular, model, or manufacturer, and that the units may be freely selected in accordance with the description of their function in the context of the invention.

The secure cabinet 10 houses all components of the system, and preferably includes an electronic locking device, such as the one manufactured by LA GARD, INC., and an associated alarm system. The shape, size, and general appearance of the cabinet is optional, although the cabinet is preferably made of steel or a similarly tamper-resistant material to prevent unauthorized access to, and otherwise protect, the internal components of the kiosk, and especially cash stored in the note and coin dispensers. If required, the secure cabinet 10 may be configured as a safe.

The illustrated touch screen display unit 2 is a 12 inch self contained flat monitor with touch screen functions manufactured by MICROTOUCH SYSTEMS, INC. as Model MCT-13411101 or 13-4111-01. A suitable controller for the touch screen display unit (not shown) is also manufactured by MICROTOUCH SYSTEMS as Model EXII-5010UC or 14-205. An alternative controller is the WAYTEC, INC. Model PD40FA11MNK controller. Again, other displays may be substituted, including soft key or cursor-controlled displays.

The illustrated keypad 3 is a ten key encrypted numeric keypad manufactured by GERTEC TELECOMUNICA-COES LTDA (BRAZIL), Model No. 004.0565.2 This may be supplemented or replaced by a biometrics reader, such as a fingerprint reader, or other secure data input device.

The note/ticket acceptor 4 is an industry standard bill validator system with a bar code reading feature that allows it to accept currency and bar coded tickets having the same dimensions as the currency in use where the casino is located. As illustrated, the note/ticket acceptor is manufactured by JCM AMERICAN CORPORATION as Model No. 13 SS JCM or Model No. WBA SH 200 JCM, which performs internal authentication of inserted notes and vouchers and generates note or voucher identification information such as the denomination of an inserted note or a bar code identifier in the case of a ticket. This information is provided to the CPU 8 and used as the basis for dispensing cash or coins in response to requests input from the touch screen display. A bin is provided as part of the note/ticket acceptor unit for receiving valid notes or tickets, although the bin may of course be provided separately. Notes/tickets that cannot be authenticated by the acceptor unit 4 are returned to the customer through the bill insertion slot.

The magnetic card read/write unit 5 accepts both magnetic stripe cards or smart cards (also known as chip cards or integrated circuit (IC) cards), although it is within the scope of the invention to accept only one type of card, or data carriers other than magnetic stripe cards or smart cards, including optical cards and magnetic or optical tokens in shapes other than cards, or even to provide a receiver that accepts wireless transmissions from appropriately equipped tokens. The unit illustrated in FIGS. 1 and 2 is an industry standard device manufactured by SANKYO SEIKI (AMERICA) INC, Model ICM300 3R1181, including a motorized card intake and ejection system of the type found on many ATM machines. Alternatively, the read/write unit could be equipped with a push pull type card reader and/or magnetic card swipe reader. In either case, the read/write unit must include an appropriate interface for transmitting and receiving data from the central processing unit.

Integrated with or separate from the card read/write unit 5 is the card dispenser/burner 52. The card dispenser is a mechanical device that feeds stacked, pre-printed cards to the read/write unit for encoding by the read/write unit, although the dispenser may optionally include an internal writing or encoding unit, a printer, and/or an embossing unit, and a communications interface for transferring data read by the read/write unit to the casino accounting/gaming system. The illustrated card dispenser is manufactured by KYTRONICS CORP., LTD (KOREA).

The note dispenser 6 is a commercially-available five bin system with four currency dispensing bins and one reject bin. Denominations are preset in the software and then the cassettes of the dispenser are filled with the correct denomination of currency. During currency dispensing the notes are sent to an escrow station. The currency is presented to the user in one bundle after the system has confirmed it has dispensed the correct amount. Mechanical or electrical malfunctions during the dispensing process result in currency being sent to the reject bin. The illustrated unit is manufactured by, or manufactured under license from, DE LA RUE plc as ATM currency dispense module MND100.

Coin dispenser 7 includes four bins that can hold up to 2000 coins. Each bin can be configured for any coin denomination. Coin dispensing is controlled by software, which permits exact payouts to the penny (for U.S. coins). The illustrated dispenser is manufactured by coin controls as Model Universal Hopper MK4 coin system. Of course, other types of control processing units, operating systems, and power supplies may be substituted.

The central processing unit 8 may be an industry standard Pentium PC running an appropriate operating system, such as LINUX, or an ITAUTEC Model P4S533-VM. The UPS can be any device arranged to protect the CPU and other components by providing circuit protection during voltage fluctuations and power during voltage loses, such as MGE Model Pulsar Ellipse 650.

Printer 11 may be used to print out receipts, tickets for events, service and usage reports, currency transaction reports for IRS verification, and so forth. The illustrated printer is an ITAUTEC thermal printer.

The kiosk further includes a communications interface (not shown), which may be a LAN interface, a TCP/IP connection to the Internet, a wireless communications system, direct wired connections to a banking system, or any other communications interface capable of transmitting and receiving data from a casino central accounting system, banking services provider, security/monitoring service, hotel reservations system, encryption or authentication key server, biometrics database server, and so forth depending on the services to be provided, as well as internal buses for carrying data and control signals for the various components of the kiosk.

The illustrated components are arranged to issue loyalty cards upon input of necessary customer data through the touch screen and keypad, and to carry out any or all of the following functions:

Ticket Redemption/Jackpot Payout
Bill Breaking
Player Point Redemption
Coupon/Show Ticket/Document Receipt Printing
ATM Functions
Issuance of Hotel Room "Keys" or Access Cards
Hotel Check In/Out
Display of Promotional Videos
Player Card Issuance
Issuance of a Sports Betting Ticket Those skilled in the art will appreciate that these functions are listed by way of illustration only, and that some of the functions may be omitted, and other functions added, without departing from the scope of the invention. Additional functions not described in detail herein include, but are not limited to, interactive messaging, streaming and/or snapshot video surveillance (in which cameras are tied to system functions to capture video of system use or system services), and display of the user interface in multiple languages. In addition, the central processing unit preferably generates records of all transactions or actions performed by the kiosk for use as an audit trail, stores the records internally and/or transmits the records to a central accounting system. If the system is capable of snapshot video surveillance, pictures may be added to a transaction log, as part of the audit trail.

Figure 3:
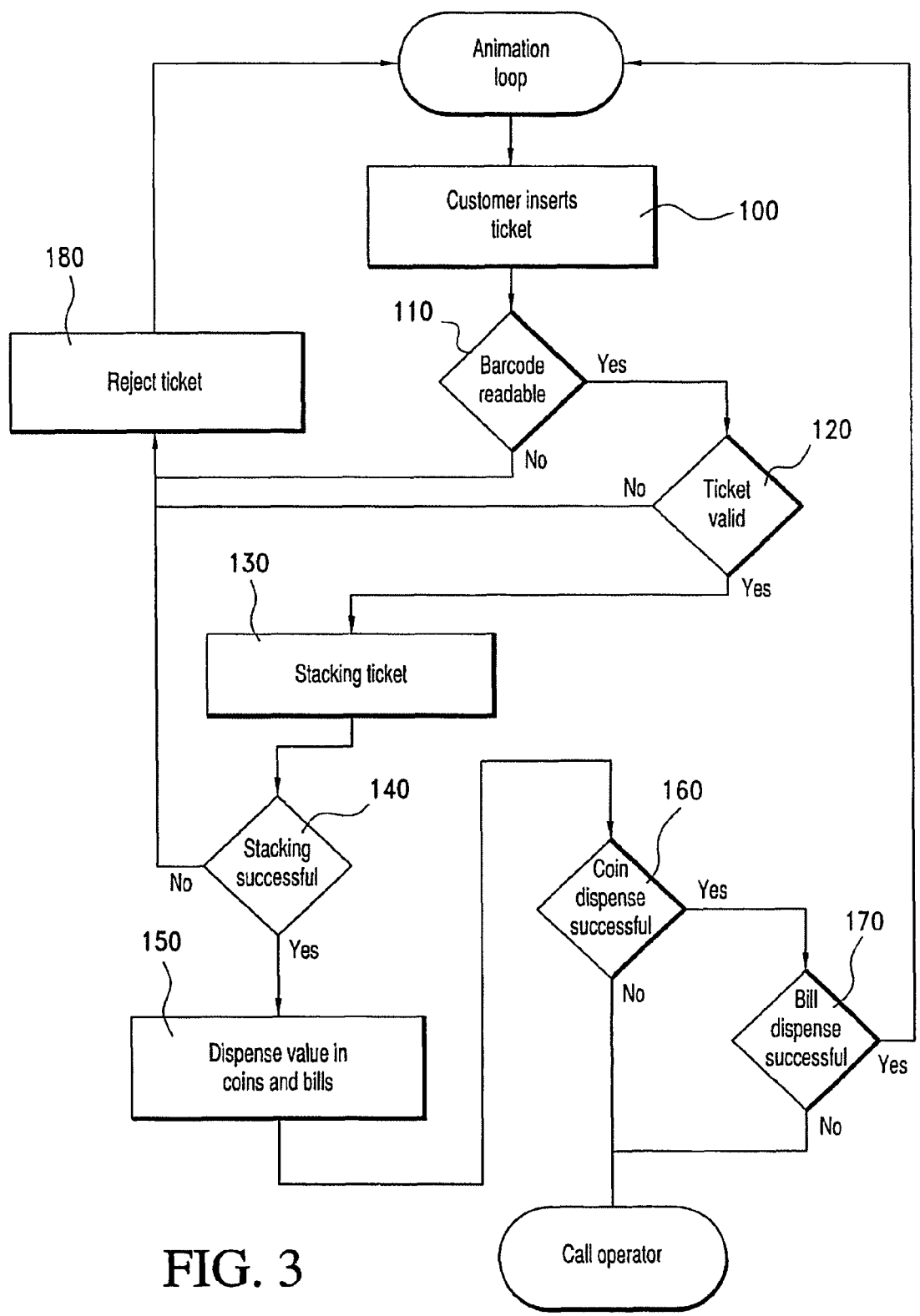
FIG. 3 is a flowchart of a ticket redemption process carried out by the kiosk of FIG. 1.

Ticket redemption permits customers to cash valid tickets at the self-service kiosk, without the assistance of casino personnel. When players are finished with their gaming entertainment, they bring their tickets to the kiosk and, as illustrated in FIG. 3, insert a bar-coded ticket into the bill/ticket acceptor (step 100). The bill/ticket acceptor then attempts to read each ticket. If readable (as determined in step 110), the ticket number is validated (step 120).

Validation may be carried out internally by the ticket/note acceptor, or the ticket/note acceptor may be arranged to send a ticket number to the central processing unit for validation, in which case the ticket may be validated by the central processing unit, or the number may be forwarded to the casino central accounting system over a TCP/IP connection for validation, after which the central processing unit or the accounting system authenticates the ticket against a ticket database. If the accounting system authenticates the ticket, it returns the authentication result, including a verified payout amount, to the central processing unit, which returns the authentication result to the note/ticket acceptor.

In step 130 of FIG. 3, the note/ticket acceptor attempts to stack the ticket in a bin. If successful, as determined in step 140, the note ticket acceptor informs the central processing unit, and the central processing unit sends the validated amount to the note and coin dispensers, which dispense the value in coins and bills (step 150). If the coin and bill dispensing process is successful, as determined at steps 160 and 170, the ticket redemption procedure is complete. If not, the signal lamp is activated to signal an operator. If the barcode is not readable or if validation fails, the ticket is immediately returned to the customer through the note/ticket acceptance slot (step 180).

Bill breaking permits customers to insert higher denomination currency into the note/ticket acceptor and receive back the same value in lower denomination currency. The dispensed mix can be set by the casino to their requirements, or alternatively may be selected by the customer via the touch screen input.

Figure 4:
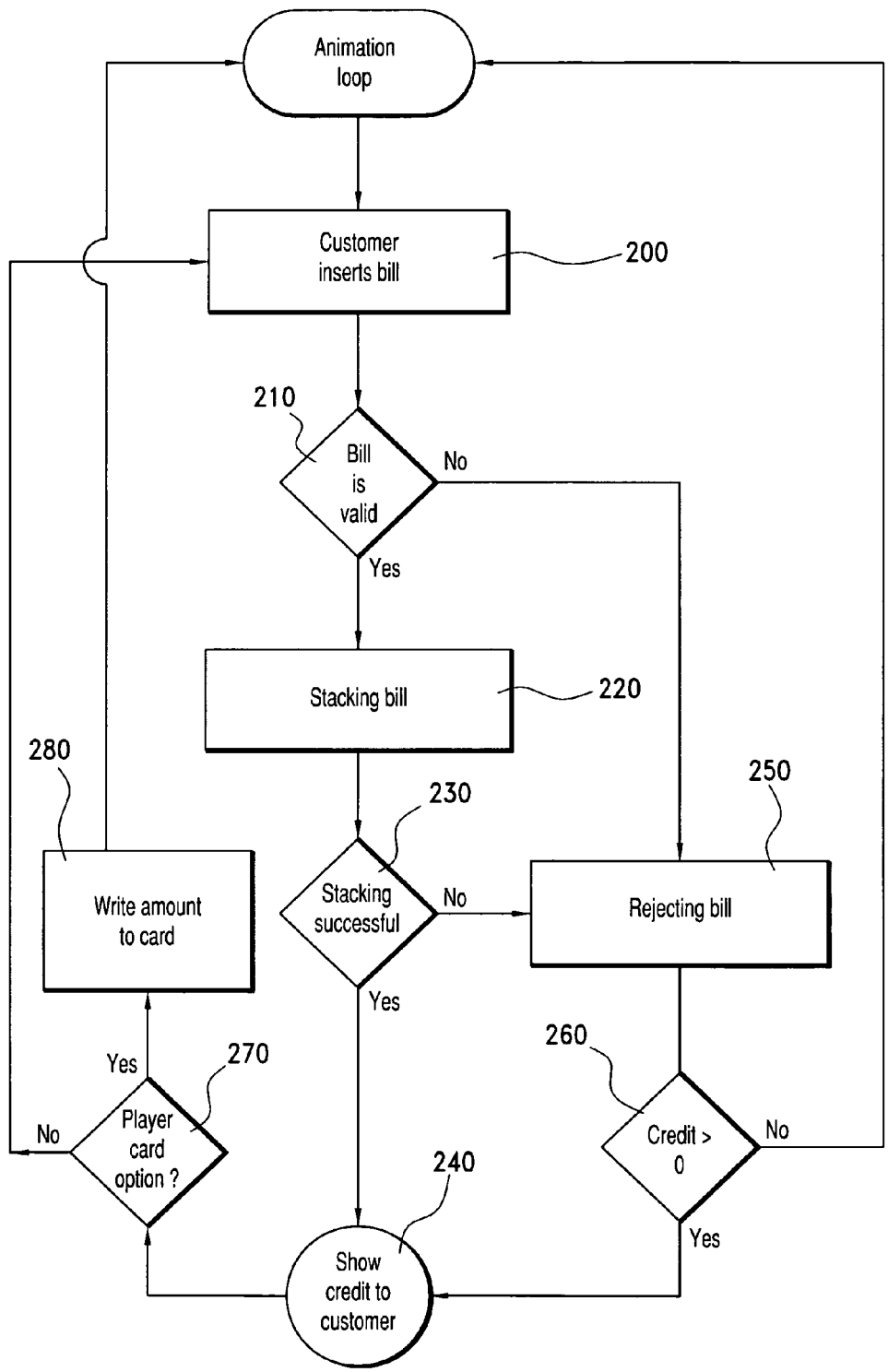
FIG. 4 is a flowchart of a bill breaking, note acceptance, and loyalty card issuance process for the kiosk of FIG. 1.

Currency validation for the purpose of bill breaking can be carried out in a manner similar to ticket validation. For the note/ticket acceptor described above, authentication is carried out within the note/ticket acceptor, although it is also possible to have the central processing unit or centrally located software carry out the authentication. As shown in FIG. 4, the validation process begins when a customer inserts a banknote or bill (step 200), after which the bill/note acceptor authenticates the bill (step 210). If valid, the note/ticket acceptor attempts to stack the bill by depositing it in a bin (step 220). If the note/ticket acceptor determines that the bill has been successfully stacked (step 230), a credit is displayed (step 240) and the customer is given a list of options, including bill breaking or writing the credit to a casino loyalty card or EFT card. If the bill cannot be validated, the bill is rejected and returned to the customer (step 250) and the process ends or is repeated for a new note depending on whether the customer has a credit from previously inserted bills, as determined at step 260. The bill breaking process is completed by sending the credit amount to the bill and coin dispensers, which dispense the appropriate amount according to steps 150-170 illustrated in FIG. 3.

In addition to being used as the basis for bill breaking, the credit amount displayed in step 240 may also be applied to a card as part of a card issuing or card managing procedure. In step 270 of the method of FIG. 4, the central processing unit determines whether the customer has elected to credit the amount shown to an inserted card, or to apply the credit to a new card. If the credit is to be applied to an inserted card, the appropriate data is written to the card (step 280), the casino central accounting system is notified to credit the customer's account, and the card is returned to the customer. If the customer has registered for a new card by selecting the card registration option, the card dispensing unit supplies a new card to the card read/write unit and writes the displayed credit amount to the new card (step 280), after which the card is supplied to the customer.

Figure 5:
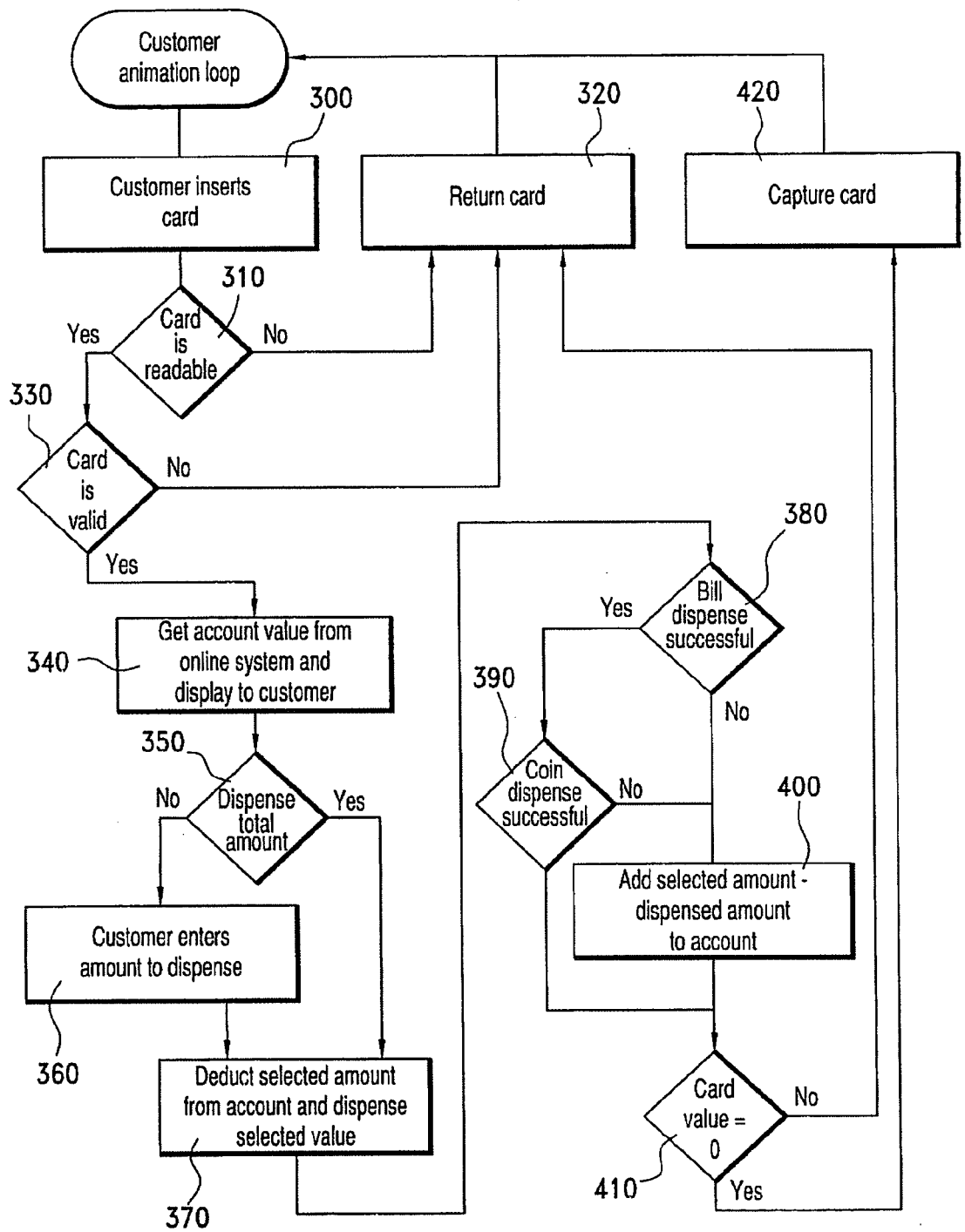
FIG. 5 is a flowchart of a card redemption process for the kiosk of FIG. 1.

FIG. 5 illustrates the card redemption procedure. In step 300, the customer inserts an existing card, after which the card/write unit and/or central processing unit determines whether the card is readable (step 310) and either returns the card (step 320) or invokes the card validation procedure (step 330). The card validation procedure is preferably carried out by the central accounting system via the TCP/IP or other network connection between the central processing unit of the kiosk and the casino central accounting system or a corresponding accounting services provider, and involves verification of a password or PIN input by the customer. Alternatively, or in addition to password or PIN validation, the validation procedure may involve comparison of biometric data input by the customer, such as a fingerprint, with biometric data stored in a corresponding database, or scanning of a bar-coded identification card such as a standard, stacked, or two-dimensional driver's license.

If the card is not valid, it is returned to the customer (step 320). If the card is valid, the account value is obtained from the central accounting system (step 340) or from the card itself and displayed for the customer. The customer is given the option of cashing out the entire amount credited to his or her account (step 350), or of inputting an amount less than the entire amount (step 360). In either case, the amount to be dispensed is deducted from the customer's account and the bill and coin dispensers are operated to dispense the indicated amount (step 370). If the dispensing operation is unsuccessful, as determined at steps 380 and 390, the amount previously debited is added back to the customer's account (step 400). If the customer has chosen to receive the entire amount available, as determined at step 410, the card is deposited in a bin and not returned to the customer (step 420). Otherwise, the card is returned to the customer (step 320).

Alternatively to dispensing cash in response to card verification, the kiosk may redeem player points recorded in the player's account, by offering gifts and printing gift coupons based on the verified point amount and player selections input through the touch screen display, and by sending acknowledgment back to the casino accounting or loyalty card management system.

In addition to self-service ticket redemption by customers, the kiosk of the invention may also be used to enable casino personnel to assisting in redeeming jackpot payouts from slot machines. An employee of the casino can use this feature to pay out the jackpot winnings, without assistance or supervisory support, by identifying himself or herself to the redemption system using a magnetic card and a PIN respectively input through the card reader/writer and keypad, and by entering a number of a winning slot machine for verification by the central accounting system. After the kiosk dispenses the winning amount, the thermal printer may be used to print appropriate IRS documentation.

Each of the transactions described above involves dispensing of cash and/or crediting or debiting of account balances, and therefore requires the establishment of an audit trail or record of the transactions. The central processing unit keeps track of all keystrokes and system functions during operation and servicing of the kiosk, in order to establish audit trails for all cash payouts, bill breaks, system entries, removal and insertion of new currency and coil fills, removal of the bill validator secure box, and all other activities including service related issues. Additionally, the kiosk preferably can be administered by creating new operators or deleting existing operators and changing the current configuration. Audit and/or settlement reports to balance the kiosk may be printed on the thermal receipt printer.

Optionally, the kiosk of the invention may be adapted to provide various automated teller machine (ATM) functions such as cash advances from a bank account or credit card, either by dispensing the cash directly or printing a receipt/voucher with the desired amount. The procedure may be identical to that employed by a conventional ATM, with verification of an ATM, debit, or credit card inserted into the card reader/writer being carried out by a financial services provider via a direct or secured TCP/IP connection. Since ATM functions are well-known, they will not be described in detail herein.

Similarly, the kiosk of the invention may be adapted to perform account management functions with respect to accounts or credit lines held or managed internally by the casino, including electronic funds transfers and cash dispensing (using the procedure illustrated in FIG. 5) based on a credit amount.

As indicated above, in addition to financial transactions, the kiosk illustrated in FIGS. 1 and 2 may be adapted to offer a variety of other customer services, such as hotel check-in/check-out, coupon or show ticket printing, display of promotion videos (both during and between customer transactions), and so forth. For hotel check-in/check-out, the customer places a credit card into the card reader as identification, the reader captures required data and sends it to the hotel reservation system and confirms the reservation upon check-in or room charges upon check-out. In the case of check-in, the customer will be instructed where to pick-up a room key, given an appropriate key code, or provided with a keycard. In the case of check-out, the customer may be given the option of confirming charges, having his or her credit card charged the approved amount, and having a receipt printed by the thermal printer, or the customer may be instructed to proceed to the front desk if there are any disputed charges.

In order to generate show tickets, the kiosk displays a menu of available attractions, seating charts, and other options. After the customer makes a selection, the customer selects a payment method such as credit card, cash, or room charge, and a PIN or other identifier as necessary. In the case of cash, the note acceptance method described above may be used to track a credit amount to be applied to the cost of the show. A PIN or other identification may also be required for room or credit card charges. Upon verification and/or approval of payment, the ticket is printed.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

I claim:

1. A casino all-in-one kiosk, comprising:
    a cabinet;
    a display and at least one data input device;
    a note/ticket acceptance unit;
    a currency dispensing unit;
    a card reader/writer arranged to receive both a card inserted by a customer and a new card supplied by a dispensing unit, the card dispensing unit being arranged to supply the new card to the card reader/writer before issuance to the customer;
    a printer; and
    a central processing unit,
    wherein the note/ticket acceptance unit, currency dispensing unit, card reader/writer, card dispensing unit, display device and data input device, printer, and central processing unit are housed within the cabinet,
    wherein the central processing unit is connected to the note/ticket acceptance unit, the currency dispensing unit, card reader/writer, card dispensing unit, and printer, and
    wherein the kiosk is arranged to carry out the following customer services:
    dispensing of currency in response to acceptance and validation of tickets inserted into the note/ticket acceptance unit;
    dispensing of notes/tickets in response to acceptance and validation of currency inserted into the note/ticket acceptance unit;
    dispensing of currency in response to reading and validation of said card inserted by the customer into the card reader/writer;
    writing data to said card inserted by the customer into the card reader/writer or said new card dispensed by the card dispensing unit;
    issuing to a customer said new card dispensed by the card dispensing unit and written-to by the card reader/writer.

2. A casino all-in-one kiosk as claimed in claim 1, wherein a card issued to the customer is a casino loyalty card.

3. A casino all-in-one kiosk as claimed in claim 1, wherein the card reader/writer is arranged to read and write to magnetic stripe cards.

4. A casino all-in-one kiosk as claimed in claim 1, wherein the card reader/writer is arranged to read and write to smart cards.

5. A casino all-in-one kiosk as claimed in claim 1, wherein the card reader/writer is arranged to read and write to smart cards and magnetic stripe cards.

6. A casino all-in-one kiosk as claimed in claim 1, wherein the at least one data input device includes an encrypted keypad.

7. A casino all-in-one kiosk as claimed in claim 1, wherein the at least one data input device includes a touch screen.

8. A casino all-in-one kiosk as claimed in claim 1, wherein the at least one data input device includes a biometric reader.

9. A casino all-in-one kiosk as claimed in claim 1, wherein the note/ticket acceptor is arranged to accept and read bar coded tickets, coupons, promotional media, and banknotes.

10. A casino all-in-one kiosk as claimed in claim 1, wherein the note/ticket acceptor is arranged to internally validate banknotes.

11. A casino all-in-one kiosk as claimed in claim 1, wherein the currency dispenser includes a bill dispenser arranged to dispense multiple denominations of bills, and a coin dispenser arranged to dispense multiple types of coins.

12. A casino all-in-one kiosk as claimed in claim 1, further comprising an interface for connecting the kiosk to a casino central accounting system.

13. A casino all-in-one kiosk as claimed in claim 10, wherein the interface is a TCP/IP interface.

14. A casino all-in-one kiosk as claimed in claim 1, further comprising an interface for connecting the kiosk to a financial services provider, and wherein the kiosk is arranged to carry out automated teller machine transactions.

15. A casino all-in-one kiosk as claimed in claim 1, wherein the printer is arranged to print receipts, coupons, and tickets.

16. A casino all-in-one kiosk as claimed in claim 15, wherein the tickets include sports betting tickets.

17. A casino all-in-one kiosk as claimed in claim 15, wherein the tickets include show tickets.

18. A casino all-in-one kiosk as claimed in claim 1, wherein the kiosk is arranged to provide hotel check-in/check-out services.

19. A casino all-in-one kiosk as claimed in claim 1, wherein the cabinet is protected by an electronic lock and alarm system.

20. A casino all-in-one kiosk as claimed in claim 1, wherein the kiosk is further arranged to provide ancillary services including at least one of the following: show promotional videos, provide directions and customer assistance or information, and display menus for maintenance personnel.

21. A casino all-in-one kiosk as claimed in claim 1, wherein the central processing unit is arranged to track all keystrokes and operations of components of the kiosk in order to establish an audit trail.

22. A casino all-in-one kiosk as claimed in claim 1, further comprising video surveillance means for capturing and storing snapshot video as part of a transaction log included in an audit trail.

23. A casino all-in-one kiosk as claimed in claim 1, wherein the data written to the card is a credit amount.

24. A casino all-in-one kiosk, as claimed in claim 1, wherein the kiosk is arranged to dispense an electronic funds transfer (EFT) card.

25. A casino all-in-one kiosk, as claimed in claim 1, wherein the card is an electronic funds transfer (EFT) card.

26. A casino all-in-one kiosk, as claimed in claim 1, wherein the kiosk is arranged to dispense a gift card.

27. A casino all-in-one kiosk, as claimed in claim 1, wherein the card is a gift card.

28. A casino all-in-one kiosk, as claimed in claim 1, wherein the kiosk is arranged to dispense a hotel room key card.

29. A casino all-in-one kiosk, as claimed in claim 1, wherein the card is a hotel room key.

30. A casino all-in-one kiosk, comprising:
a cabinet;
a display and at least one data input device;
a note/ticket acceptance unit;
a currency dispensing unit;
a card reader/writer arranged to receive both a card inserted by a customer and a new card supplied by a dispensing unit, the card dispensing unit being arranged to supply the new card to the card reader/writer before issuance to the customer;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and
wherein the kiosk is arranged to carry out the following customer services: dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing indicia that is visible to the unaided human eye to said card inserted into the card reader/writer or said new card dispensed by the card dispensing unit;
issuing to a customer said new card dispensed by the card dispensing unit and written-to by the card reader/writer.

31. A casino all-in-one kiosk, comprising:
a cabinet;
a display and at least one data input device;
a note/ticket acceptance unit;
a card reader/writer arranged to receive both a card inserted by a customer and a new card supplied by a dispensing unit, the card dispensing unit being arranged to supply the new card to the card reader/writer before issuance to the customer;
a card dispensing unit;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and wherein the kiosk is arranged to carry out the following customer services:
dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing both machine readable data and indicia that is visible to the unaided human eye to said card inserted by the customer into the card reader/writer or said new card dispensed by the card dispensing unit;
issuing to a customer said new card dispensed by the card dispensing unit and written-to by the card reader/writer.

32. A casino all-in-one kiosk, comprising:
a cabinet;
a display and at least one data input device;
a note/ticket acceptance unit;
a currency dispensing unit;
a card reader/writer arranged to receive both a card inserted by a customer and a new card supplied by a dispensing unit, the card dispensing unit being arranged to supply the new card to the card reader/writer before issuance to the customer;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and
wherein the kiosk is arranged to carry out the following customer services:
dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing indicia that is visible to the unaided human eye to said card inserted by the customer into the card reader/writer or said new card dispensed by the card dispensing unit;
erasing visible indicia that have been previously printed on the card;

issuing to a customer said new card dispensed by the card dispensing unit and written-to by the card reader/writer.

33. A casino all-in-one kiosk, comprising:

a cabinet;
a display and at least one data input device;
a note/ticket acceptance unit;
a currency dispensing unit;
a card reader/writer arranged to receive both a card inserted by a customer and a new card supplied by a dispensing unit, the card dispensing unit being arranged to supply the new card to the card reader/writer before issuance to the customer;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and
wherein the kiosk is arranged to carry out the following customer services:
dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing indicia that is visible to the unaided human eye to said card inserted by the customer into the card reader/writer or said new card dispensed by the card dispensing unit;
erasing visible indicia that have been previously printed on the card inserted by the customer into the card reader/writer;
writing new indicia that is visible to the unaided human eye to the card inserted by the customer into the card reader/writer;
issuing to a customer said new card dispensed by the card dispensing unit and written-to by the card reader/writer.

34. A casino all-in-one kiosk, comprising:

a cabinet;
a display and at least one data input device;
a note/ticket acceptance unit;
a currency dispensing unit;
a card reader/writer arranged to receive both a card inserted by a customer and a new card supplied by a dispensing unit, the card dispensing unit being arranged to supply the new card to the card reader/writer before issuance to the customer;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and
wherein the kiosk is arranged to carry out the following customer services:
dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing both machine readable data and indicia that is visible to the unaided human eye to said card inserted by the customer into the card reader/writer or said new card dispensed by the card dispensing unit;
erasing visible indicia that have been previously printed on the card inserted by the customer into the card reader/writer;
erasing or overwriting any machine readable data that has been previously written to the card inserted by the customer into the card reader/writer;
issuing to a customer said new card dispensed by the card dispensing unit and written-to by the card reader/writer.

35. A casino all-in-one kiosk, comprising:

a cabinet;
a display and at least one data input device;
a note/ticket acceptance unit;
a currency dispensing unit;
a card reader/writer arranged to receive both a card inserted by a customer and a new card supplied by a dispensing unit, the card dispensing unit being arranged to supply the new card to the card reader/writer before issuance to the customer;
a printer; and
a central processing unit,
wherein the note/ticket acceptance unit, currency dispensing unit, card reader/writer, card dispensing unit, display device and data input device, printer, and central processing unit are housed within the cabinet,
wherein the central processing unit is connected to the note/ticket acceptance unit, the currency dispensing unit, card reader/writer, card dispensing unit, and printer, and
wherein the kiosk is arranged to carry out the following customer services: dispensing of currency in response to acceptance and validation of tickets inserted into the note/ticket acceptance unit;
dispensing of notes/tickets in response to acceptance and validation of currency inserted into the note/ticket acceptance unit;
dispensing of currency in response to reading and validation of said card inserted by the customer into the card reader/writer;
writing both machine readable data and indicia that is visible to the unaided human eye to said card inserted by the customer into the card reader/writer or said new card dispensed by the card dispensing unit;
erasing visible indicia that have been previously printed on the card inserted by the customer into the card reader/writer;
erasing or overwriting any machine readable data that has been previously written to the card inserted by the customer into the card reader/writer;
writing new indicia that is visible to the unaided human eye to the card inserted by the customer into the card reader/writer;
writing new machine readable data to the card inserted by the customer into the card reader/writer;
issuing to a customer said new card dispensed by the card dispensing unit and written-to by the card reader/writer.

* * * * *